United States Patent [19]

Grachtrup

[11] 4,315,439

[45] Feb. 16, 1982

[54] DRIVE APPARATUS FOR ROTARY UNIT

[75] Inventor: Heinz Grachtrup, Ennigerloh, Fed. Rep. of Germany

[73] Assignee: Krupp Polysius AG, Beckum, Fed. Rep. of Germany

[21] Appl. No.: 149,837

[22] Filed: May 14, 1980

[30] Foreign Application Priority Data

Jun. 7, 1979 [DE] Fed. Rep. of Germany ... 7916367[U]

[51] Int. Cl.[3] .............................................. F16H 37/06

[52] U.S. Cl. .................................... 74/661; 74/665 L; 74/665 Q; 74/665 A; 192/48.4; 192/8 R; 192/0.098

[58] Field of Search ................. 74/661, 665 A, 665 B, 74/665 L, 665 N, 665 Q; 192/8 R, 12 B, 15, 0.098, 48.8, 48.4

[56] References Cited

U.S. PATENT DOCUMENTS

| | | | |
|---|---|---|---|
| 2,403,378 | 7/1946 | Kilpela | 192/48.4 |
| 2,885,907 | 5/1959 | Glamann | 74/665 B |
| 3,252,553 | 5/1966 | Peterson | 192/48.4 |
| 3,290,963 | 12/1966 | Oldfield | 74/661 X |
| 3,683,719 | 8/1972 | Gros | 74/661 |
| 3,757,912 | 9/1973 | Ball | 192/0.098 X |
| 3,797,232 | 3/1974 | Muller | 74/661 X |
| 3,855,878 | 12/1974 | Steiner | 74/665 Q |
| 3,933,059 | 1/1976 | Houck | 74/661 |
| 3,983,693 | 10/1976 | Werner | 74/665 B |

FOREIGN PATENT DOCUMENTS

| | | | |
|---|---|---|---|
| 742794 | 1/1956 | United Kingdom | 74/665 N |

*Primary Examiner*—Nile C. Byers, Jr.

*Attorney, Agent, or Firm*—Learman & McCulloch

[57] ABSTRACT

The invention relates to a drive arrangement for a rotating unit designed to be driven by a main motor or an auxiliary motor. A shift clutch is provided for arresting an overriding clutch in both directions of rotation. In this way the torques emanating from the rotating unit can be held or suppressed.

22 Claims, 16 Drawing Figures

FIG. 3
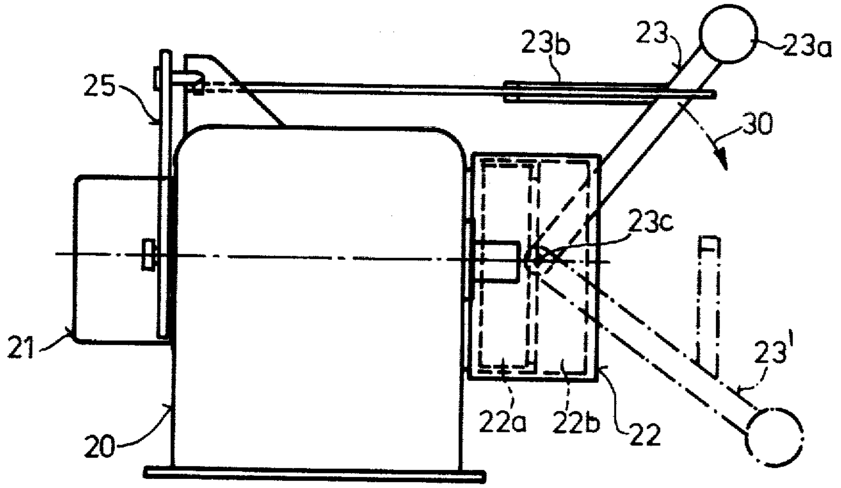
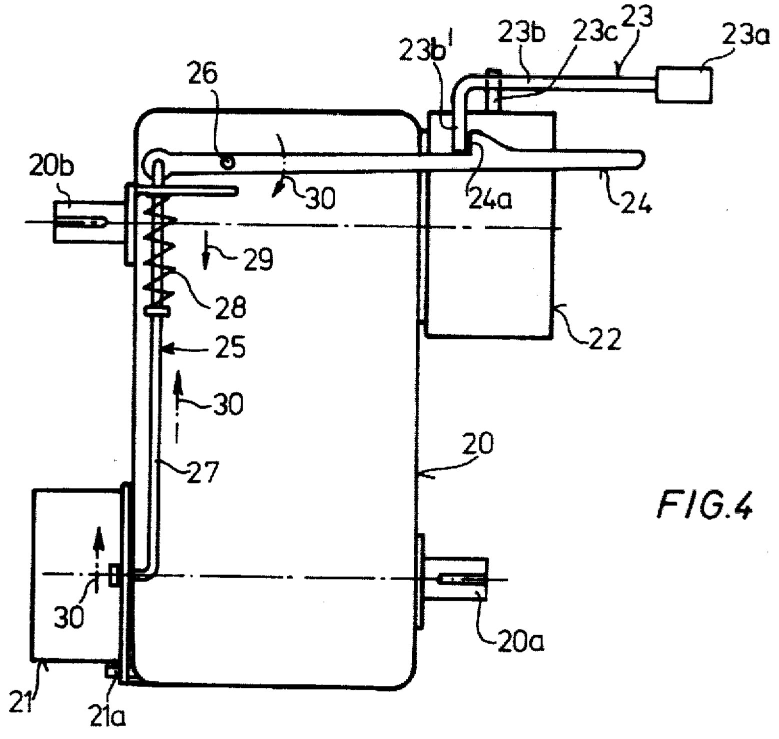
FIG. 4

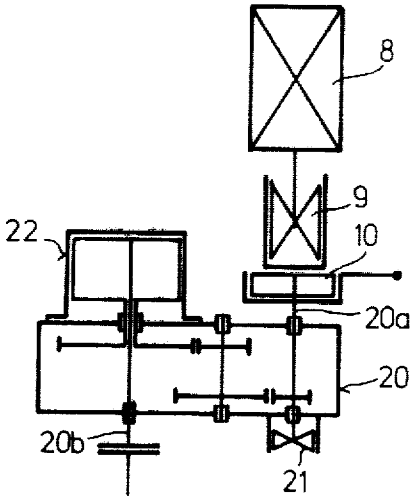
FIG. 5
FIG. 6
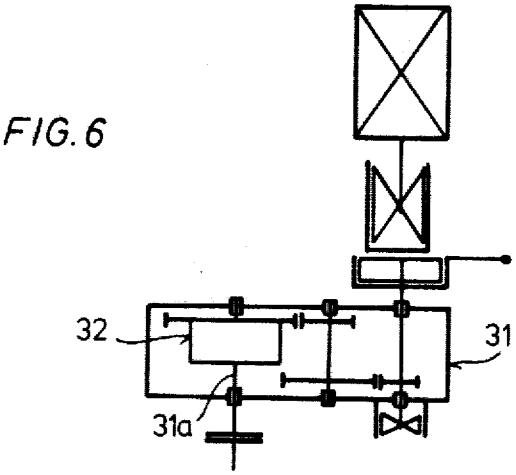

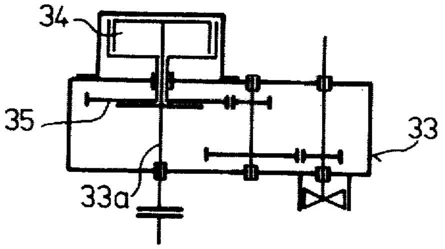
FIG. 7
FIG. 8
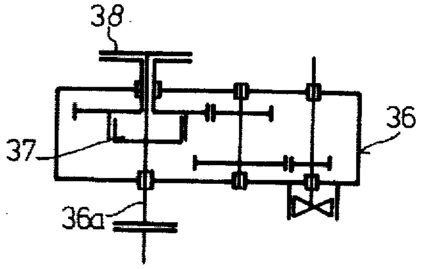
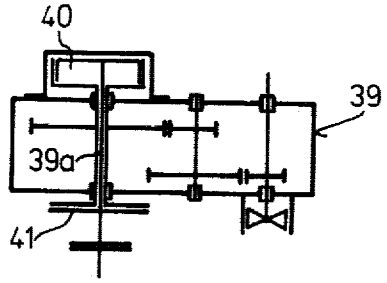
FIG. 9
FIG. 10
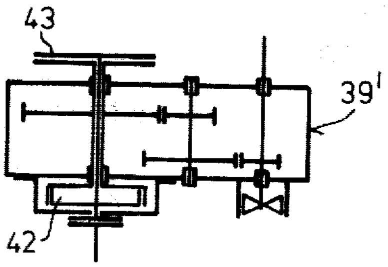

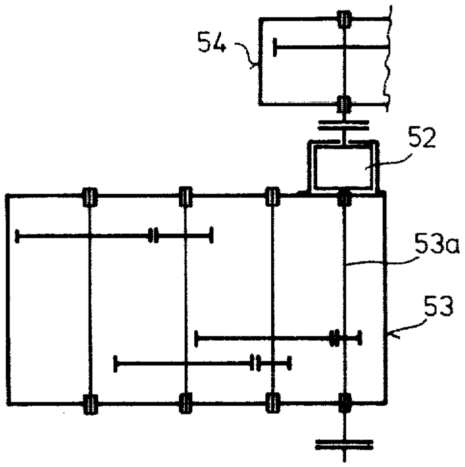
FIG. 14
FIG. 15
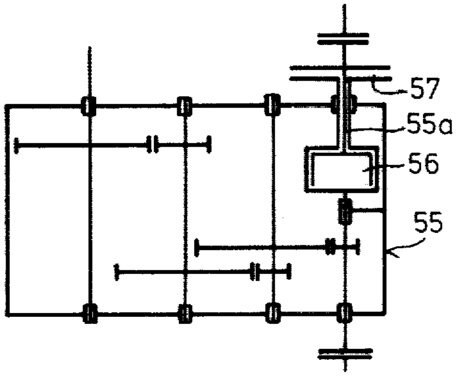
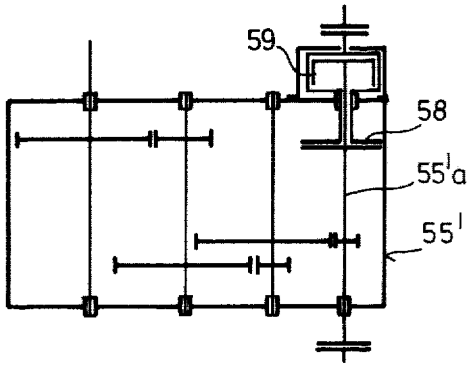
FIG. 16

DRIVE APPARATUS FOR ROTARY UNIT

BACKGROUND OF THE INVENTION

This invention relates to a drive arrangement for a rotating unit, such as a rotary drum, drum mill or the like, comprising a main motor, a main transmission unit arranged between the main motor and the unit to be driven, an auxiliary motor, an auxiliary transmission unit arranged between the auxiliary motor and the main transmission unit, a centrifugal brake arranged between the auxiliary motor and the main motor, and an overriding clutch for overriding the auxiliary transmission unit.

In addition to a main motor and a main transmission unit, drive arrangements of the type used in particular for relatively large rotating units, such as rotary kilns, drum mills and the like, comprise an auxiliary transmission unit which is driven by an auxiliary motor and of which the output shaft is also drivingly connected to an input shaft of the main transmission unit. The auxiliary transmission unit may be used for example to drive the rotating unit up to a certain rotational speed via the main transmission unit during the start-up phase, after which the main motor for the main drive is engaged with its higher rotational speed for full-load operation. An overriding clutch is used in the transmission link between the auxiliary transmission unit and the main transmission unit, establishing a flexible connection between the auxiliary transmission unit and the main transmission unit in one direction of rotation. After a certain rotational speed has been reached and after the main motor has been engaged, this flexible connection is broken by "overriding;" in other words the drive from the auxiliary transmission unit to the main transmission unit and to the rotating unit is suspended. In addition, the auxiliary transmission unit with the auxiliary motor is important in assembly or repair work when the rotating unit has to be rotated slowly and at intervals.

If for example a rotary kiln or a drum mill is driven by an auxiliary motor in conjunction with an auxiliary transmission unit, it occasionally happens that this unit seeks to lead the drive which, in the case of a rotary kiln equipped with planetary cooling tubes, can occur for example when one of the cooling tubes has been removed or otherwise even when deposits or the like have built up within the unit on one side thereof. This leading of the drive or even merely leading final oscillations of the rotating unit can endanger the drive elements on account of the increased rotational speed involved.

Various types of drive arrangements have become known in practice for counteracting the above-mentioned problems. For example, attempts have been made to arrange a shiftable gear coupling between the main transmission unit an the auxiliary transmission unit in a drive arrangement for a rotary kiln. Although a gear coupling such as this is basically suitable for transmitting varying torques, it is only possible in this case to obtain final oscillation of the rotary kiln (for example after the drive has been switched off) by an electrically braked main motor or by an additionally installed differential recoil brake which enables the gear coupling to be introduced. However, constructions such as these have never been adopted for use in practice on account of the labile braking behavior.

Since, in cases where overriding clutches are used, they are unable to prevent the rotating unit from automatically leading, the search for effective solutions has continued.

Another embodiment which is known in practice contains between the main motor and main transmission unit double-shoe brakes which, although capable of stopping a rotary kiln for example from leading while it is stationary, are attended by the disadvantage that unintentional braking during operation can have a damaging effect on driving components. Although the differential recoil brakes mentioned above—should it be desired to use them instead of the double-shoe brakes—do not have a damaging effect in the event of unintentional braking during operation, they do have the disadvantage that, in this event, they are also unable to prevent the rotating unit from leading.

SUMMARY OF THE INVENTION

The object of the invention is to provide a drive arrangement of the type mentioned (including above all an overriding clutch) by which the torques emanating from the rotating unit, or rather the rotational movements emanating therefrom, can be suppressed in a particularly reliable manner.

According to the invention, this object is achieved by a shift clutch for arresting the overriding clutch in both directions of rotation.

By virtue of the embodiment according to the invention, the overriding clutch employed in the usual way in this drive arrangement is able to function as usual in the state in which it is not arrested by the shift clutch. When the shift clutch is brought into operation as required, the overriding clutch passes into its arrested state, i.e., into the state in which the drive connection between the auxiliary transmission unit and the main transmission unit is flexibly established in both directions of rotation; in other words a torque emanating from the rotating unit may be transmitted in both directions. In this way, it is possible in particular to avoid any leading of the rotating unit in an extremely reliable manner. If, therefore, a rotary kiln for example (or, similarly, even a drum mill) transmits a torque to the drive arrangement, for example through the formation of a deposit inside the rotary kiln on only one side thereof, through the accumulation of material or even as result of corresponding assembly or repair work, this torque can be reliably held. Rotational movements attributable thereto may of course also be suppressed accordingly.

DESCRIPTION OF THE DRAWINGS

Advantageous embodiments of the invention are described in detail in the following with reference to examples illustrated in the accompanying drawings, wherein:

FIG. 3 is a simplified front elevation of an auxiliary transmission system equipped with an overriding clutch/shift clutch structural unit, a centrifugal brake and an automatic safety shift mechanism for the shift clutch.

FIG. 4 is a plan view of the auxiliary transmission unit shown in FIG. 3.

FIGS. 5 to 16 are simplified diagrammatic illustrations (in plan) of details of variants of the drive arrangement according to the invention and which demonstrate the various possibilities of arranging the overriding clutch and shift clutch.

DETAILED DESCRIPTION

Figure 1:
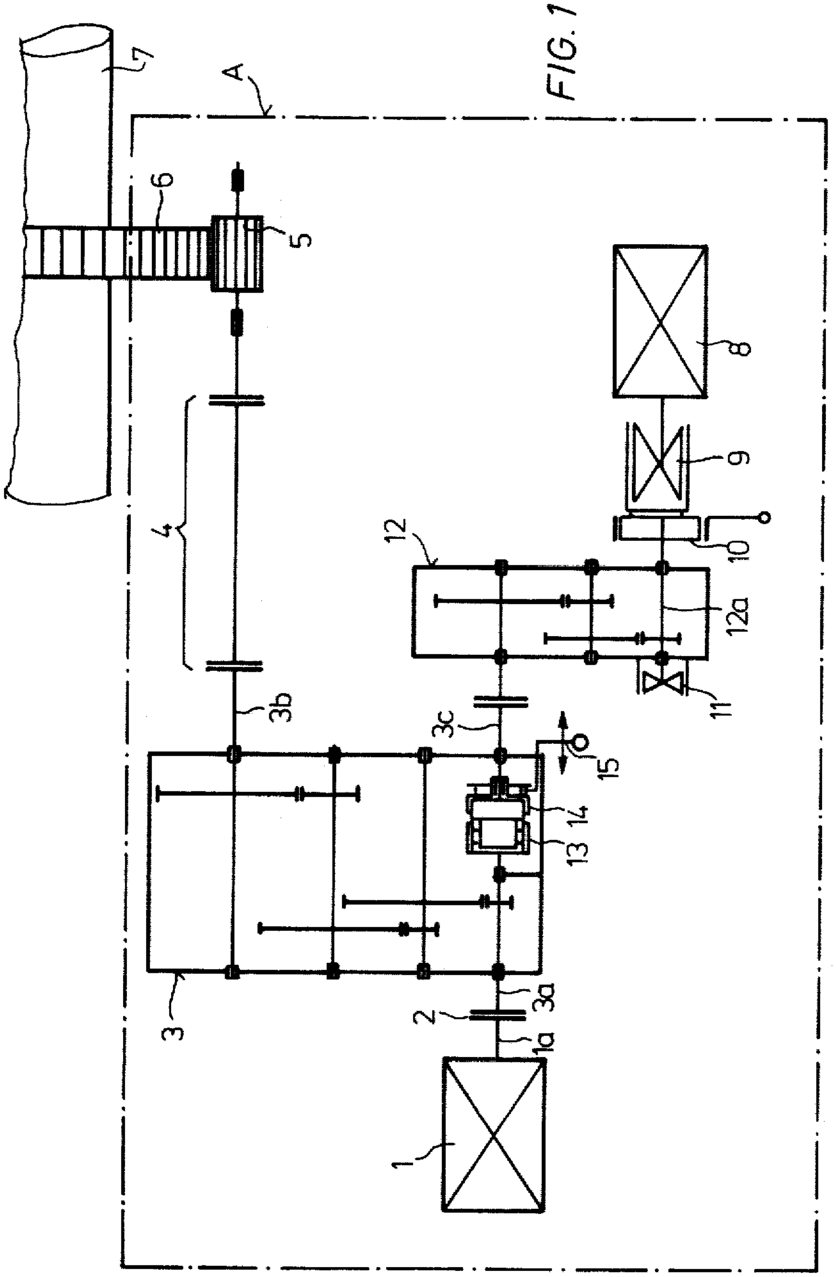
FIG. 1 is a diagrammatic plan view of a first embodiment of the drive arrangement according to the invention.

The entire drive arrangement A according to the invention is shown best in the diagrammatic plan view illustrated in FIG. 1. This drive arrangement may be divided into a main drive and an auxiliary drive. The main drive contains as usual a variable direct-current motor which forms the main motor 1 and of which the driven shaft 1*a* is flexibly connected through an elastic coupling 2 to the main input shaft 3*a* of a main transmission unit 3. An intermediate drive pinion 5 is coupled in the usual way to the driven shaft 3*b* through an elastic coupling 4, driving a gear ring 6 fixed to the rotating unit which may be formed for example by a rotary kiln 7.

The above-mentioned auxiliary drive includes an auxiliary motor 8 in the form of a three-phase induction motor which is connected by a starting clutch 9 and double-shoe brake 10 to the input shaft 12*a* of an auxiliary transmission unit 12 on whose input shaft 12*a* a centrifugal brake 11 is additionally arranged on the outside facing the double-shoe brake 10.

In addition, an automatic overriding clutch 13 is provided as the drive connection between the auxiliary transmission unit 12 and the main transmission unit 3. It is essential to the invention that a shift clutch 14 is associated with this overriding clutch 13 to arrest it in both directions of rotation.

In the embodiment illustrated in FIG. 1, the overriding clutch 13 and the shift clutch 14 are provided as a structural unit within the main transmission unit 3 and are arranged on the second input shaft 3*c* of the main transmission unit 3 connected to the auxiliary transmission unit 12. To enable the overriding clutch 13 to be brought into its arrested and non-arrested state, i.e., to enable the shift clutch 14 to be engaged and disengaged, a shift lever 15 is associated with the shift clutch 14. This shift lever 15 extends outwards from the main transmission unit 3 and may be operated manually, electrically, hydraulically or pneumatically, according to requirements and to the overall lay-out of the drive arrangement A.

Figure 2:
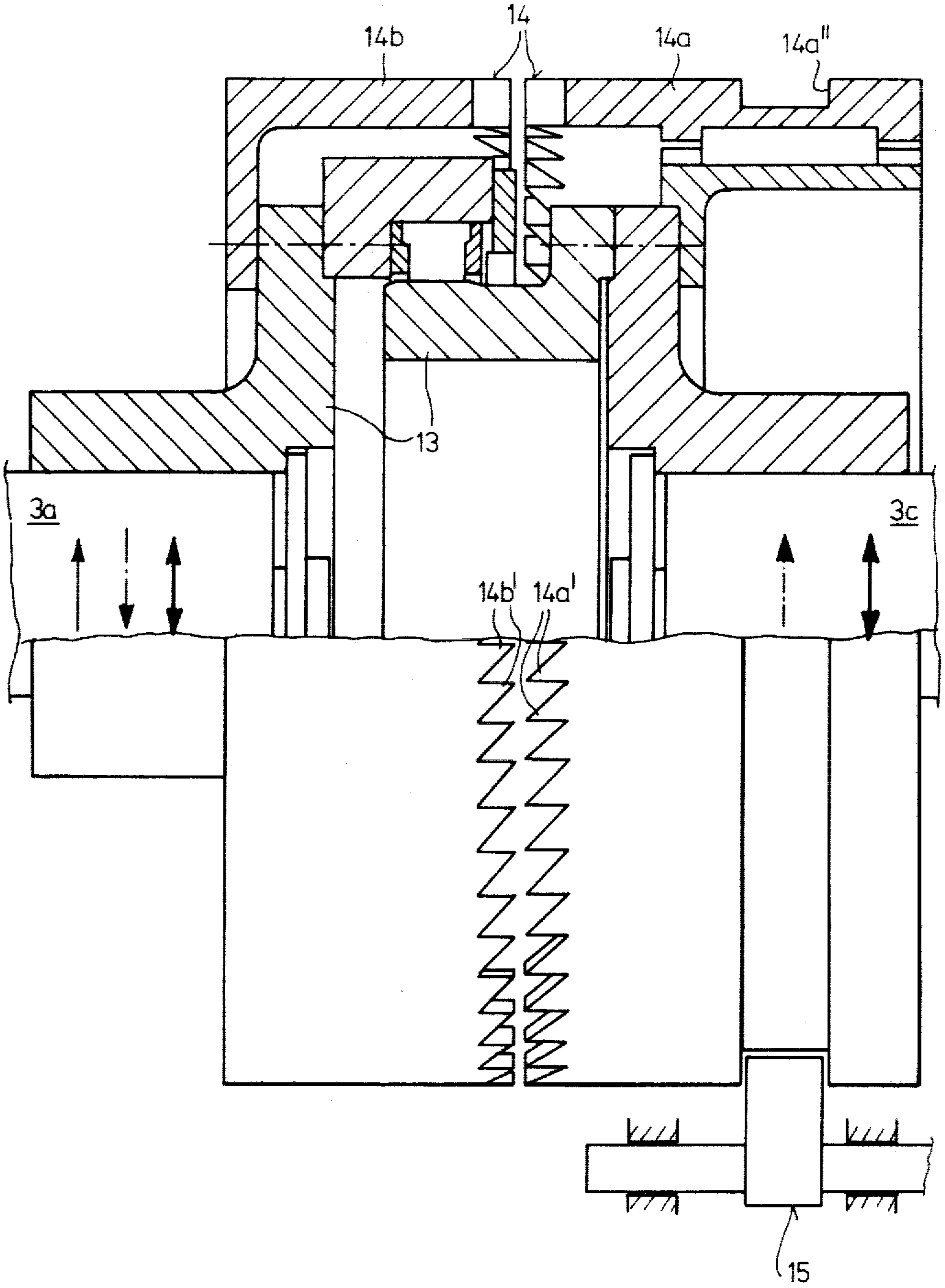
FIG. 2 is a view, partly in section, of a structural unit formed by a shift clutch and overriding clutch.

FIG. 2 shows an embodiment of an overriding clutch/shift clutch structural unit of the type which may be used for instance in the example illustrated in FIG. 1 (in this case, therefore, within the main transmission unit 3). In this embodiment, the shift clutch 14 is largely in the form of a housing surrounding the inner, multipart overriding clutch 13 which connects the second input shaft 3*c* (input from the auxiliary transmission unit 12) to the first input shaft 3*a* (input from the main motor 1) of the main transmission unit 3 in the usual way. The shift clutch 14 is formed essentially by two annular parts 14*a* and 14*b* of which the mutually facing peripheral edges comprise complementary engagement elements, in this case teeth 14*a*' and 14*b*'. Whereas the part 14*b* (the left-hand part in FIG. 2) of the shift clutch is fixedly connected to the associated part of the overriding clutch, the other part 14*a* (i.e., the right-hand part in FIG. 2) of the shift clutch is designed and connected to the corresponding part of the overriding clutch in such a way that it is axially displaceable towards the other part 14*b* of the shift clutch so that the teeth 14*a*' and 14*b*' can be engaged with and disengaged from one another, thereby placing the overriding clutch in its arrested state and non-arrested state, respectively. This engagement and disengagement of the shift clutch 14, particularly the part 14*a* thereof, is effected by the shift lever 15 (not shown in detail in FIG. 2) which engages in a peripheral groove 14*a*'' in the part 14*a* of the shift clutch.

In order to illustrate the various operational states of the clutch, a thin solid-line arrow, a thin dash-dot-line arrow and a thick solid-line arrow have been drawn on the overriding clutch 13 (on the left-hand side of FIG. 2) while a thin dash-dot-line arrow and a thick arrow have been drawn on the shift clutch 14 (on the right-hand side of FIG. 2). If, therefore, the overriding clutch 13 (cf. thin solid-line arrow) runs freely, for example when the rotary kiln 1 is being driven by the main motor 1, it is not arrested, i.e., the shift clutch is disengaged (position shown in FIG. 2). In the position indicated by the thin dash-dot-line arrow, the overriding clutch 13 flexibly connects the auxiliary transmission unit to the main transmission unit without the shift clutch 14 being engaged, as is the case for example during the stopping oscillation of the rotary kiln 7 and also when the rotary kiln 7 is driven by the auxiliary transmission unit 12. If it is desired above all to prevent leading, i.e., to ensure that an increased torque emanating from the rotary kiln 7 can be held, the overriding clutch 13—as indicated by the thick double arrow—and, in addition, the shift clutch 14 are are flexibly engaged (teeth 14*a*' and 14*b*' in meshing engagement with one another), so that the overriding clutch is arrested in both directions of rotation.

The modes of operation of the drive arrangement according to the present invention are explained by way of example in the following with reference to FIG. 1:

(a) Drive by main motor:

The main motor 1 is switched on without the auxiliary transmission unit 12 being driven because the overriding clutch 13 runs freely, thereby interrupting the flow of power to the auxiliary transmission unit 12. At the same time, the shoe brake 10 is opened. If now the main motor 1 is switched off, the rotational speed of the rotary kiln 1 returns to zero, after which the rotary kiln 7 reverses its direction of rotation and oscillates to a standstill. As a result of this change in the direction of rotation, the outer ring of the overriding clutch 13 is entrained so that the auxiliary transmission unit 12 is driven, after which the centrifugal brake 11 is activated and protects the input shaft 12*a* of the auxiliary transmission unit 12 against excessive rotational speeds. If the main motor 1 is switched off in consequence of a power failure, the double-shoe brake is closed in the usual way (by interruption of current) so that the rotary kiln 7 does not oscillate to a standstill, but instead is held in its direction-reversing position. Before the main motor 1 is switched back on again, the rotary kiln 7 must first oscillate to a standstill by release of the double-shoe brake 10 so that it enters its dead-center position.

(b) Emergency operation with auxiliary motor drive:

The auxiliary motor 8 is switched on and, at the same time, the double-shoe brake 10 is opened. Under the effect of the flow of power through the overriding clutch 13, the rotary kiln 7 is driven by the auxiliary motor 8, the main motor remaining switched off. When the auxiliary motor 8 is switched off, the double-shoe brake 10 is closed at the same time. The auxiliary motor 8 may be switched back on again with the kiln in any position, i.e., the kiln does not have to oscillate to a standstill beforehand. In unusual operational states, for example when the satellite cooling tubes of the rotary kiln 7 are unequally filled, the overriding clutch 13 may with advantage be arrested by engagement of the shift clutch 14, so that the rotary kiln 7 is reliably prevented from leading.

(c) Repair operation with auxiliary motor drive:

In order to bring the rotary kiln 7 (or any other corresponding rotating unit) into a favorable position for repair work (or even assembly work), it may be driven by means of the auxiliary motor in the same way as in emergency operation—as described in b. In this case, however, it is important that the overriding clutch 13 should always be arrested by the engaged shift clutch 14 so that the rotary kiln 7 is reliably prevented from leading in any repair or assembly position.

Now, it can happen in practice that, when the overriding clutch is in its arrested position, i.e., when the shift clutch is engaged, the main motor is accidentally switched on. In this case, the auxiliary transmission unit with the auxiliary motor would assume such high rotational speeds because of the given speed transmission that serious damage could be caused. In order to avoid this, a speed-dependent or load-dependent automatic safety shift mechanism for the shift clutch is best provided in the drive arrangement according to the invention. In the case mentioned by way of example, this safety shift mechanism automatically interrupts the flow of power through the shift clutch by disengaging the shift clutch so that the drive elements of the auxiliary transmission unit (including the auxiliary motor) are thus afforded reliable protection against excessive rotational speeds. FIGS. 3 and 4 illustrate one possible embodiment of an automatic safety shift mechanism of the type in question for the shift clutch. In this embodiment, a conventional auxiliary transmission unit 20 may be provided, comprising an input shaft **20*a* connected to the auxiliary motor (not shown) and a substantially diagonally opposite output shaft 20*b* connected to the main transmission unit (not shown either). With the input shaft 20*a* of this auxiliary gear unit 20, a conventional centrifugal brake 21 is provided on the outside facing the input end. In this case, the overriding clutch and the shift clutch are combined to form a structural unit 22 and are flanged onto the outside of the auxiliary transmission unit 20 which faces the driven end (i.e., the outside facing towards to the main transmission unit—not shown). The overriding clutch 22*a* and the shift clutch 22*b* (merely represented by chain lines in FIG. 3) are connected to or may be coupled with the driven shaft 20*b*. This embodiment of the auxiliary transmission unit 20 with the overriding clutch/shift clutch structural unit 22 flanged on is shown very clearly in FIG. 5 in regard to its structure, particularly so far as the gear transmission is concerned. The auxiliary motor 8, the start-up clutch 9 and the double-shoe brake 10 may be constructed in the same way as in the embodiment shown in FIG. 2 and connected to the input shaft 20*a* of the auxiliary transmission unit 20. One particular advantage of the embodiment illustrated in FIG. 5 lies in the fact that the main transmission unit (not shown) and, for the most part, the auxiliary transmission unit 20 also may be massproduced in the usual way and the structural unit 22** formed by the overriding clutch and shift clutch is relatively easy to fit and is readily accessible.

In order to explain the above-mentioned embodiment of the safety shift mechanism, reference is again made to FIGS. 3 and 4. It can be seen that the structural unit 22 formed by the overriding clutch and shift clutch comprises a shift lever 23 which is connected to the shift clutch **22*b* and which may be substantially identical with the shift lever 15 mentioned in reference to FIGS. 1 and 2 (at least so far as the shift function is concerned). This shift lever 23 is pivotal about a shaft 23*c* and comprises a weight 23*a* at its free outer end. In addition, a detent arm 23*b* is provided on the shift lever 23, projecting towards the transmission unit 20 in the upper position of the lever (shown in solid lines in FIG. 3) and comprising a detent projection 23*b*' bent downwards at substantially a right angle. When the shift clutch 22*b* is engaged, as shown in solid lines in FIGS. 3 and 4, this detent projection 23*b*' engages with a facing detent projection 24*a* of a two-armed lever 24 which belongs to a shift linkage 25 and is mounted for rotation about a shaft 26 on the auxiliary transmission unit 20. That end of the lever 24 which is opposite the detent projection 24*a* is pivotally connected by a link rod 27 to the centrifugal brake 21 which is connected to the auxiliary transmission unit 20 by a universal-joint shaft 21*a*. In the normal position, as shown in FIG. 4, the link rod 27 (and hence the shift linkage 25 as well) is biased in the direction of the arrow 29 by a helical spring 28, so that the detent projection 24*a* of the lever 24 is kept in engagement with the detent projection 23*b*' of the shift lever 23**.

The safety shift mechanism illustrated in FIGS. 3 and 4 operates as follows:

When the shift clutch **22*b* is engaged for the purpose of arresting the overriding clutch 22*a*, the shift lever 23 (in FIG. 3) is in its upper position (solid lines in FIGS. 3 and 4). In this position, the safety shift mechanism connects the shift clutch 22*b* via the shift linkage 25 to the centrifugal brake 21, in particular by bringing the detent projections 23*b*' and 24*a* of the shift lever 23 and the two-armed lever 24** into engagement with one another.

In the event for example of an operating error which causes the main motor of the drive arrangement to be switched on, the driven shaft **20*b* of the auxiliary transmission unit 20 is also driven by the main motor via the main transmission unit. This means that the input shaft 20*a* of the auxiliary transmission unit and the centrifugal brake 21 connected to this input shaft 20*a* are also driven. When a certain rotational speed is reached at the centrifugal brake 21, it responds and transmits a braking moment to the pivotally mounted (at 21*a* ) housing of this centrifugal brake 21**.

If the force emanating from the braking moment of the centrifugal brake exceeds the spring force of the helical spring 28 on the shift linkage 25, the housing of the centrifugal brake 21, the link rod 27 and the lever 24 are turned or shifted in the direction of the dash-dot-line arrows 30, so that the detent projections **24*a* and 23*b*' of the lever 24 and the shift lever 23, respectively, are disengaged, as a result of which the shift lever 23 of the shift clutch 22*b* is released and drops downwards—arrow 30 in FIG. 3—under its own weight (assisted by the weight 23*a* ) into the dash-dot position 23' so that the shift clutch 22*b* is automatically disengaged and the overriding clutch 22*a* is released from its arrested position. In this way, the flow of power through the auxiliary transmission unit 20 is also interrupted so that no damage can be caused to the auxiliary transmission unit 20** (including the auxiliary motor and associated components) by excessive rotational speeds.

Further variants of the drive arrangement according to the invention are described briefly in the following with reference to FIGS. 6 to 16 which are purely diagrammatic illustrations. In this connection, it is immediately pointed out that the overall construction of the drive arrangement is largely identical with the embodiment illustrated in FIG. 1, the differences in the embodiments which will now be described lying mainly in the particular configuration and arrangement of the overriding clutch and shift clutch.

The embodiment shown in FIG. 6 comprises in particular an auxiliary transmission unit 31 to whose driven shaft 31a the overriding clutch and shift clutch are connected. In this case, too, the overriding clutch and shift clutch are combined to form a structural unit 32, of the type already described with reference to the preceding embodiments. In FIG. 6, however, the structural unit 32 formed by the overriding clutch and shift clutch is arranged within the auxiliary transmission unit, as can clearly be seen. In this way, the main transmission unit may again be massproduced and provision is made for the safe supply of oil to the transmission unit.

FIG. 7 shows an embodiment in which the overriding clutch 34 is flanged as an individual component onto the outside of the auxiliary transmission unit 33, i.e., onto the outside facing the driven end, while the shift clutch 35 is arranged within the auxiliary transmission unit 23 on the driven shaft 33a to which the overriding clutch 34 is also connected. The particular advantage lies in the ready accessibility of the overriding clutch 34 and in the massproduction of the main transmission unit.

FIG. 8 shows as it were a reversal of the prevously described embodiment. In this case, the overriding clutch 37 is arranged within the auxiliary transmission unit 36 (on the driven shaft 36a), while the shift clutch 38 for the overriding clutch 37 is arranged on the outside facing the driven end of the transmission unit 36. The advantage of this embodiment again lies in the massproduction of the main transmission unit and, above all, in the reliable supply of oil to the overriding clutch 37.

In the embodiment illustrated in FIG. 9, the overriding clutch 40 and the shift clutch 41 are again associated as separate components with the driven shaft 39a of the auxiliary transmission unit 39, but are connected to one another for arresting purposes. The shift clutch 41 and the overriding clutch 40 are arranged on opposite outsides of the auxiliary transmission unit 39; the shift clutch 41 is arranged on the driven side while the overriding clutch 40 is arranged on the opposite outside so that the overriding clutch remains readily accessible.

FIG. 10 shows a reversal of the embodiment according to FIG. 9 in which the overriding clutch 42 is arranged on the driven side while the shift clutch 43 is arranged on the opposite outside of the auxiliary transmission unit 39'. In the embodiment shown in FIG.9 and also in the embodiment shown in FIG. 10, the main transmission unit may again be massproduced.

Figure 11:
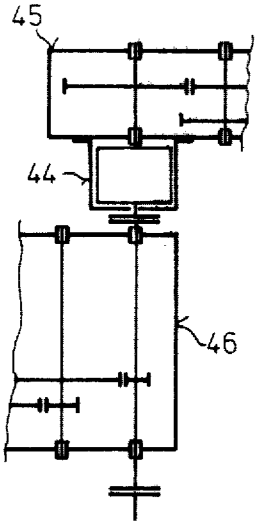

FIG. 11 shows an embodiment in which the overriding clutch and the shift clutch are again in the form of a structural unit and are arranged on the outside of the auxiliary transmission unit. In contrast to the embodiment illustrated in FIGS. 3 to 5, however, the structural unit 44 formed by the overriding clutch and shift clutch is flanged onto the driven side of the auxiliary transmission unit 45, i.e., onto the outside facing the main transmission unit 46. In this way, the main transmission unit 46 may be completely massproduced and the auxiliary transmission unit largely massproduced.

Figure 12:
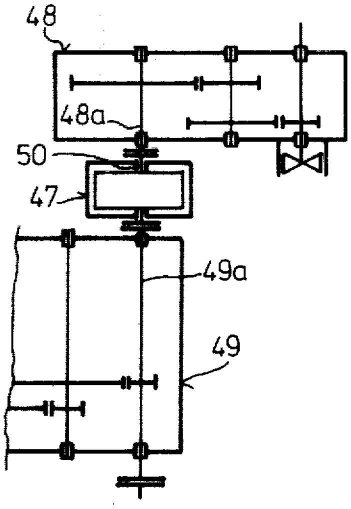
Figure 13:
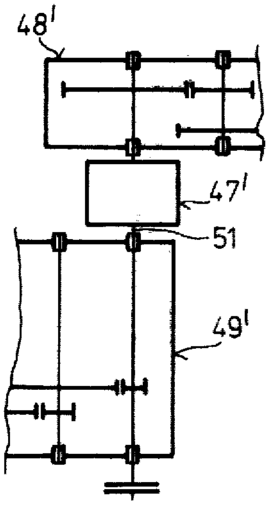

FIGS. 12 and 13 show embodiments in which the overriding clutch and the shift clutch are again combined to form structural units 47 and 47', but are provided in the drive connection between the auxiliary transmission unit 48 and 48' and the main transmission units 49 and 49'. In FIG. 12, the structural unit 47 formed by the overriding clutch and shift clutch is arranged on a connecting shaft section 50 which is coupled at one end to the input shaft 49a of the main transmission unit 49 facing the auxiliary transmission unit 48 and, at its other end, to the output shaft 48a of the auxiliary transmission unit 48. By contrast, in the embodiment shown in FIG. 13, the structural unit 47' formed by the overriding clutch and shift clutch is arranged overhung on the shaft 51 connecting the auxiliary transmission unit 48' to the main transmission unit 49'. In both embodiments (FIGS. 12 and 13), the main transmission unit and the auxiliary transmission unit may be massproduced.

Mass production of the main transmission unit and the auxiliary transmission unit is also permitted by the embodiment illustrated in FIG. 14 in which a structural unit 52 formed by the overriding clutch and shift clutch is flanged onto the outside of the main transmission unit 53 (in association with the corresponding input shaft 53a) facing the auxiliary transmission unit 54. In this case, the auxiliary transmission unit may be massproduced, while the largely massproduced main transmission unit merely has to be designed to receive the flanged-on structural unit 52.

In the embodiments illustrated in FIGS. 15 and 16, the overriding clutch and shift clutch are associated as functionally interconnected individual components with the main transmission units 55 and 55' or, rather, with their respective input shafts 55a and 55a' connected to the auxiliary transmission unit (not shown). In the embodiment illustrated in FIG. 15, the overriding clutch 56 is arranged within the main transmission unit 55 while the shift clutch 57 is arranged on the outside of the main transmission unit 55 facing the auxiliary transmission unit. By contrast, FIG. 16 shows an embodiment in which the shift clutch 58 is arranged within the main transmission unit 55' while the overriding clutch 59 is arranged on the outside of the main transmission unit facing the auxiliary transmission unit. In both cases, however, the auxiliary transmission unit may be massproduced.

The disclosure is representative of a presently preferred embodiment of the invention, but is intended to be illustrative rather than definitive thereof. The invention is defined in the claims.

I claim:

1. In a drive arrangment for a rotating unit, such as a rotary kiln, a drum mill, or the like having a main motor, a main transmission unit arranged between the main motor and the unit to be driven, an auxiliary motor, an auxiliary drive transmission unit arranged between the auxiliary motor and the main transmission unit, a centrifugal brake arranged between the auxiliary motor and the main transmission unit, and an overriding clutch rotatable in each of two opposite directions for overriding the auxiliary drive, the improvement comprising a shift clutch engageable with the overriding clutch for arresting the overriding clutch in both directions of rotation.

2. A drive arrangement according to claim 1 wherein the overriding clutch and the shift clutch are associated with the input shaft of the main transmission unit connected to the auxiliary transmission unit.

3. A drive arrangement according to claim 2 wherein the overriding clutch and the shift clutch are arranged as a structural unit within the main transmission unit and a shift lever for the shift clutch projects outwards.

4. A drive arrangement according to claim 2 wherein the overriding clutch and the shift clutch are flanged as a structural unit onto the outside of the main transmission unit facing the auxiliary transmission unit.

5. A drive arrangement according to claim 2 wherein the overriding clutch is arranged within the main transmission unit while the shift clutch is arranged on the outside of the main transmission unit facing the auxiliary transmission unit.

6. A drive arrangement according to claim 2 wherein the shift clutch is arranged within the main transmission unit and the overriding clutch is arranged on the outside of the main transmission unit facing the auxiliary transmission unit.

7. A drive arrangement according to claim 1 wherein the overriding clutch and the shift clutch are associated with the driven shaft of the auxiliary transmission unit connected to the main transmission unit.

8. A drive arrangement according to claim 7 wherein the overriding clutch and the shift clutch are arranged as a structural unit on the outside of the auxiliary transmission unit.

9. A drive arrangement according to claim 8 wherein the structural unit formed by the overriding clutch and shift clutch is flanged onto the outside of the auxiliary transmission unit facing the driven side.

10. A drive arrangement according to claim 8 wherein the structural unit formed by the overriding clutch and shift clutch is flanged onto the drive side of the auxiliary transmission unit.

11. A drive arrangement according to claim 7 wherein the overriding clutch and the shift clutch are arranged as a structural unit within the auxiliary transmission unit.

12. A drive arrangement according to claim 7 wherein the overriding clutch is flanged onto the outside of the auxiliary transmission unit facing the driven side while the shift clutch is arranged within the auxiliary transmission unit on the driven shaft.

13. A drive arrangement according to claim 7 wherein the overriding clutch is arranged within the auxiliary transmission unit on the driven shaft while the shift clutch is arranged on the outside of the auxiliary transmission unit facing the driven side.

14. A drive arrangement according to claim 7 wherein the shift clutch and the overriding clutch are arranged on opposite outsides of the auxiliary transmission unit.

15. A drive arrangement according to claim 1 including a speed- or load-dependent automatic safety shift mechanism for the shift clutch.

16. A drive arrangement according to claim 15 wherein the safety shift mechanism connects the shift clutch to the centrifugal brake through a shift linkage.

17. A drive arrangement according to claim 1 wherein the overriding clutch and the shift clutch are arranged as a structural unit in the drive connection between the auxiliary transmission unit and the main transmission unit.

18. A drive arrangement according to claim 17 wherein the structural unit formed by the overriding clutch and shift clutch is arranged on a connecting shaft section which is coupled at one end to the input shaft of the main transmission unit facing the auxiliary transmission unit and, at its other end, to the output shaft of the auxiliary transmission unit.

19. A drive arrangement according to claim 17 wherein the structural unit formed by the overriding clutch and shift clutch is arranged overhung on the shaft connecting the auxiliary transmission unit to the main transmission unit.

20. A drive arrangement according to claim 1 wherein the shift clutch is manually operable.

21. A drive arrangement according to claim 1 including electrical means for operating said shift clutch.

22. A drive arrangement according to claim 1 including fluid means for operating said shift clutch.

* * * * *